United States Patent Office.

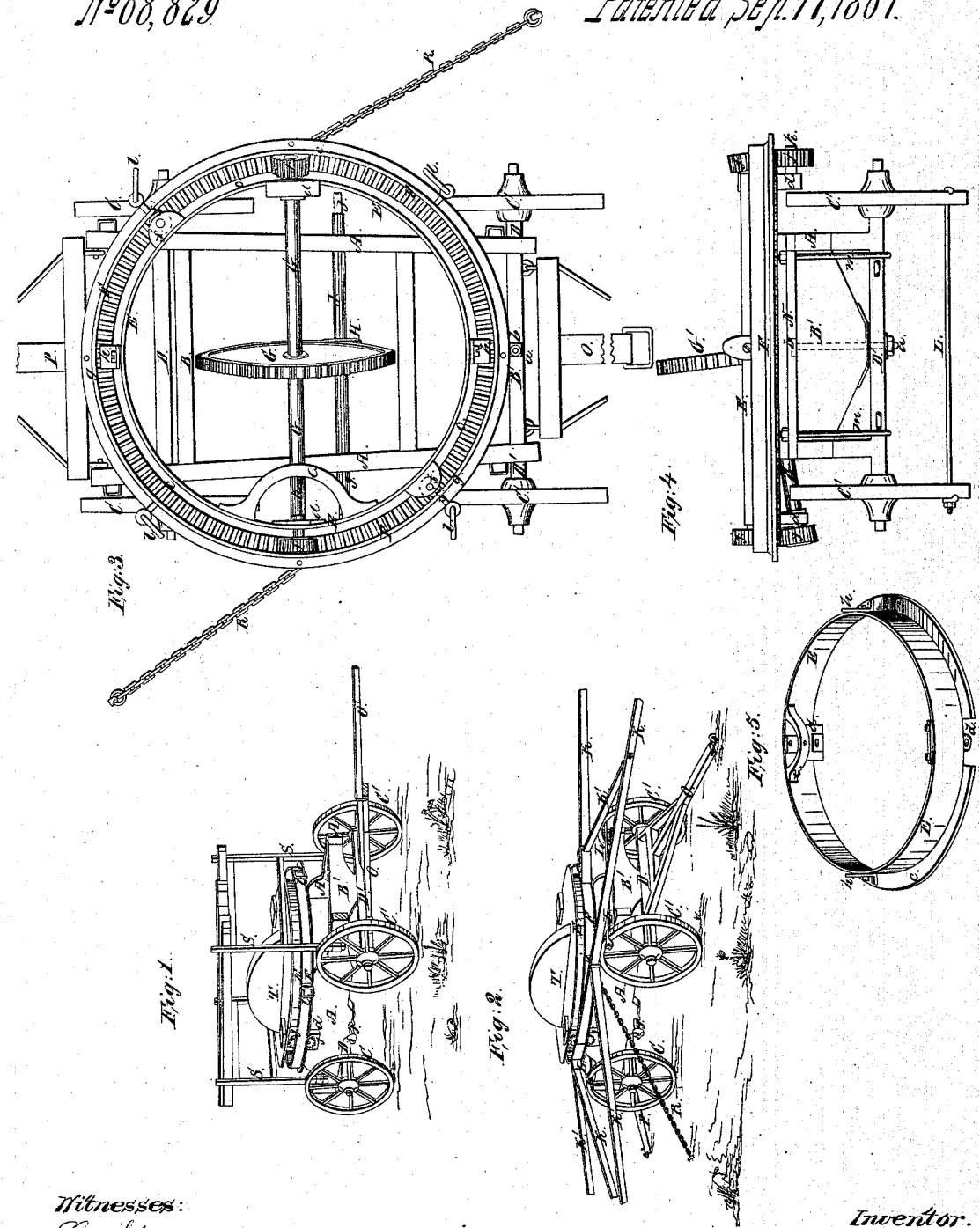

HIRAM ALDRIDGE, OF GOSHEN, INDIANA.

Letters Patent No. 68,829, dated September 17, 1867.

IMPROVEMENT IN PORTABLE HORSE-POWER.

*The Schedule referred to in these Letters Patent and making part of the same.*

TO ALL WHOM IT MAY CONCERN:

Be it known that I, HIRAM ALDRIDGE, of Goshen, in the county of Elkhart, and State of Indiana, have invented certain new and useful improvements on Portable Horse-Powers; and I do hereby declare that the following is a full, clear, and exact description of the same, reference being had to the accompanying drawings, making a part of this specification, in which—

Figure 1 is a perspective view, showing my improved portable horse-power arranged for transportation.

Figure 2 is a perspective view of the horse-power staked to the ground and arranged for operation.

Figure 3 is a top view of the horse-power, showing more particularly the construction of it.

Figure 4 is an elevation of the front end of the same.

Figure 5 is a view of the metallic circular bearing frame detached from the carriage-frame.

Similar letters of reference indicate corresponding parts in the several figures.

This invention relates to certain novel improvements on portable horse-powers, which are mounted upon and applied permanently to four-wheel carriages, so that they can be transported from one place to another with facility, without having to employ a separate conveyance for this purpose. My invention relates particularly to that well-known class of powers which have their sweep-levers applied to a horizontal spurred ring, revolving around and communicating motion to a central master-wheel, although the invention is not confined to this peculiar class of powers, but may include any of them which are adapted for being mounted upon transporting wheels permanently.

The main object of my invention is to adapt horse-powers which are mounted upon four transporting wheels, to be operated successfully while resting upon said wheels, by the employment of certain contrivances which shall securely lock and hold the wheels, and stake the machine immovably upon the ground, as will be hereinafter described.

The invention also consists in a metallic frame or ring, which is applied upon the top of the carriage-frame, and so constructed as to afford substantial and unyielding bearings for the shafts composing parts of the horse-power, and also serve as a support and guide for the spurred ring, which encircles its circumference, as will be hereinafter described.

It further consists in a driving-shaft arranged beneath the driving power and transporting frame, and adapted to serve as a means of communicating motion from either side of the machine, to threshing and other machinery, as will be hereinafter explained.

It finally consists in the application to a portable, four-wheeled horse-power, of an auxiliary supporting frame, which is removable at pleasure, and which is adapted for receiving and carrying the sweep-levers and their braces, and other parts of the machine, which are not in use during the transportation of the machine, from one place to another.

To enable others skilled in the art to understand my invention, I will describe one practical mode of carrying it into effect.

The carriage-frame upon which the horse-power is mounted and permanently secured, consists of two longitudinal side beams, A A, connected together near their front and rear ends by means of transverse beams B B', the latter one of which is adapted to serve as a bolster over the front axle, as shown in fig. 4. This rectangular frame is mounted upon four transporting wheels, C C and C' C', which are applied on the ends of their respective axles D D'. The rear axle D is secured rigidly to the carriage-frame, and the front axle D' is connected centrally to the front cross-beam or bolster B' by means of a vertical king-bolt, $a$, which has a clamping-nut, $b$, screwed upon its upper end, by means of which the axle D' can be secured rigidly to its frame or loosened at pleasure. On top of the carriage-frame, and secured rigidly to it, is an annular metallic frame, E, which is constructed of one piece of metal and provided with a base flange, $c$, hangers $d\ d$, and a bracket, $e$. This ring-frame has also secured to it, at suitable points, roller bearings $f\ f$ for carrying the anti-friction roller-guides $f'\ f'$, which bear against the inner surface of a flange, $g$, formed upon a spurred ring, F, as shown in fig. 3. At proper intervals from said roller-guides $f'\ f'$, holding-down plates or brackets $h\ h$ are secured to the circumference of the ring-frame E for preventing the toothed ring F from springing up out of place. The ring F is constructed with teeth upon its upper and lower surfaces, inside of the annular flange $g$, which teeth engage with pinion spur-wheels $j\,j$ and $j'\,j'$, the former two of which are keyed upon the ends of the inclined master-wheel shaft G, and the latter two, $j''\,j$, are applied loosely upon fixed shafts $k\,k$, which are supported by the ring-frame E. The shaft G is inclined, so that its pinion spur-wheels will both engage with and be driven by the teeth on ring F, one wheel engaging with the upper set of teeth and the other wheel engaging with the lower set of teeth. At regular intervals apart upon the circumference of the ring F links or loops $l\,l\,l\,l$ are pivoted, for allowing of the attachment of arms or sweeps K K, and their tangent braces K' K'. The arms K are passed through the loops $l\,l$, and attached at one end to the circumferential flange of ring F, by bolts or pins; and the braces K' are hooked at one end to the loops $l$, and pivoted at the opposite ends to the arms K, as shown in fig. 2. When the spurred ring F is revolved about its axis, its teeth will communicate a rotary motion to the inclined shaft G, upon which is keyed the master-wheel G'. This wheel G' engages with the teeth of a pinion, H, which is keyed upon a horizontal transverse shaft, J, arranged in suitable bearings beneath the frame-beams A. This shaft J thus receives a rapid rotary motion from the master-wheel, which motion can be communicated to various kinds of machines, through the medium of tumbling-shafts connected to one or both ends of said shaft by means of suitable couplings. By having this shaft J project out suitable distances from the sides of the carriage-frame, and providing both its ends with couplings, it will be seen that this shaft will afford two different coupling-hitches at one time, which is of great importance, especially in operating threshing machines and separators. The "three-hitch" gear is now generally used for driving threshing cylinders; the "two hitches" on the left of such cylinders requiring a "haw" hitch, and the one on the right a "gee" hitch. The shaft J affords a "haw" and "gee" motion, always with "haw" draught.

Having described one form of horse-power, which I prefer to use, though I do not confine myself to it, and also described my improved double driving-shaft, I will now describe a mode of locking the wheels upon which the power is mounted, and securing the machine to the ground, so that said wheels shall rest upon the ground during the operation of the power, and afford a substantial support therefor.

I employ for each pair of transporting wheels a clamping-rod, L, shown in figs. 2 and 4, which rod is hooked around the felloe of one wheel, and passed through the eye of a hook, which embraces the felloe of the opposite wheel; then by means of a nut applied upon said rod the two wheels are drawn tightly, so that their hubs are caused to bear hard against the shoulders on the axles. The rear rod L may pass through the longitudinal beams of the carriage-frame, and thus secure the rear wheels to this frame, and prevent them from turning. The front axle D' is secured against turning toward the right or left by means of the clamping-nut $b$, as before described, and also by means of vertical hooked rods $m\,m$, shown in fig. 4. These rods $m$ are hooked under the axle D', near its extremities, and passed up through a transverse bar, N, which rests upon the frame-beams A A, and upon the upper ends of these rods nuts are screwed, so as to draw the axle tight and hold it firmly in place. Instead of using the clamps L above described, the front and rear wheels may be connected securely together on each side of the carriage, by means of clamps and turn-buckles, or in any other suitable manner. The vibration of the machine being all removed from the hubs of the wheels, and the transporting frame and forward axle being properly secured and bound firmly together, the machine is ready to be secured to the ground. The hound or lever O, which is pivoted to the front axle D', is so arranged that the pole O' can be detached from it at pleasure. The pole O is always detached previously to commencing the fastening of the machine to the ground, so as to leave the hounds to be used as the front brace, by spiking its outer end down, as shown in fig. 2. A similar brace, P, is attached to the rear axle D, and its outer end spiked down to the ground. To complete the fastening of the machine to the ground I employ two chains, R R, which are securely attached to the sides of the machine and carried off in opposite directions, as shown in figs. 2 and 3, and spiked down, so that they serve as braces for preventing the machine from moving out of place during the operation of the power. Instead of the chains R, rigid beams or braces may be employed for fastening the machine in place upon the ground. I have provided a removable frame for receiving and supporting the sweep-levers, stakes, and other parts used in securing the machine rigidly in place upon the ground, which frame consists of uprights connected together by cross-bars and inserted into staples in the sides of the transporting frame, as shown in fig. 1. When the horse-power is to be used the frame S is removed, so as to leave the upper portion of the machine clear for the sweep-levers to pass around. The platform T upon the machine serves as a covering and protection for the gearing, and also affords a support for the driver, as shown in figs. 1 and 2.

I am aware that horse-powers have been mounted upon wheels before my invention, for the purpose of transporting them from one place to another, but no provision was ever made for rigidly locking the transporting wheels and securing them, together with the carriage-frame and horse-power, down firmly upon the ground for operation. By making such provision the transporting wheels do not require to be removed from the carriage-frame. This frame does not require to be elevated and supported so as to raise the wheels from the ground, and the driving and coupling-shaft J is always held at a given height from the ground. For these and other reasons a single person can in a few minutes arrange a horse-power for operation, whereas several persons are required to attend the horse-powers hitherto used for the purpose of lifting and adjusting them in position for operation.

Having described my invention, what I claim as new, and desire to secure by Letters Patent, is—

1. The movable hounds or braces O P applied to the front and rear ends of a portable horse-power in such manner as to secure these ends down to the ground upon their wheels, substantially as described.

2. The combination of diagonal braces or ties R R with the inclined braces O P, and a portable horse-power which is mounted upon four wheels, substantially as described.

3. Locking devices applied to the transporting wheels of a four-wheel horse-power, substantially as and for the purposes described.

4. Locking devices applied to the front axle of a four-wheel portable horse-power, substantially as described.

5. The construction of the cast-iron ring E, for the purposes and substantially as described.

6. The arrangement of the coupling-shaft J, or its equivalent, so as to admit of the attachment of tumbling shafts to both ends of it, substantially as described.

7. The auxiliary removable supporting frame S, applied to the portable horse-power frame, substantially in the manner and for the purpose described.

8. Combining sweep or lever horse-powers with a permanent four-wheel carriage for transporting the same, and which is arranged with means that will admit of the locking of its wheels and the securing of the machine down upon the ground upon its wheels for operation, substantially as described.

9. The permanent hound or brace O applied to the front axle of a portable horse-power in such manner as to prevent said axle from moving right or left on its wheels, when said power is operated substantially as described.

10. The diagonal braces or ties R R applied to a portable horse-power, which is mounted upon and adapted for being operated upon four wheels, substantially as described.

HIRAM ALDRIDGE.

Witnesses:
ALLEN SMITH,
W. L. BIVINS.